United States Patent [19]
Downes

[11] 3,853,212
[45] Dec. 10, 1974

[54] CONVEYOR BELT TRANSFER MECHANISM

[75] Inventor: John J. Downes, Chicago, Ill.

[73] Assignee: Velten & Pulver, Inc., Chicago, Ill.

[22] Filed: Aug. 31, 1973

[21] Appl. No.: 393,421

[52] U.S. Cl. .................................. 198/27, 198/232
[51] Int. Cl. ............................................. B41j 25/00
[58] Field of Search .......... 198/20, 232, 27, 102, 75

[56] References Cited
UNITED STATES PATENTS

| | | | |
|---|---|---|---|
| 2,794,534 | 6/1957 | Forrester | 198/34 |
| 3,129,804 | 4/1964 | Niekamp | 198/232 X |
| 3,241,651 | 3/1966 | Colby | 198/20 R X |

Primary Examiner—Richard A. Schacher
Assistant Examiner—James M. Slattery
Attorney, Agent, or Firm—Prangley, Dithmar, Vogel, Sandler & Stotland

[57] ABSTRACT

A transfer mechanism mounted between two conveyors for transferring objects therebetween. The transfer mechanism is movable between a conveying position thereof and a stop position thereof and is operatively connected to control mechanism for one of the conveyors to halt the conveyor upon movement of the transfer mechanism to the stop position thereof.

10 Claims, 3 Drawing Figures

3,853,212

CONVEYOR BELT TRANSFER MECHANISM

This invention relates to a transfer mechanism for transferring objects from a first conveyor to a second conveyor across a transfer roller, and more particularly, to a safety device which is operative to de-energize the first conveyor if an article becomes wedged between the first conveyor and the transfer roller.

It is a general object of the present invention to provide a transfer mechanism which operates as a safety device to de-energize a conveyor if an article is not successfully transferred from one conveyor to another conveyor or if the conveyor jams.

Another object of the present invention is to provide a mechanism for transferring objects from a first conveyor having a first conveying reach to a second conveyor spaced from the first conveyor and having a second conveying reach, the mechanism comprising a pair of arms mounted for movement with respect to one of the conveyors and carrying a transfer roller therewith, the roller being movable with the arms between a conveying position thereof wherein the roller is disposed with the upper surface thereof substantially in alignment with the conveying reaches to provide a support surface for objects being transferred between the conveyors and a stop position thereof wherein the roller is disposed below the conveying reaches, biasing means continually urging the arms and the roller to the conveying position thereof, and control mechanism responsive to movement of the arms and the roller to the stop position thereof for stopping one of the conveyors, whereby the roller provides a support surface between the conveyors when the arms and the roller are in the conveying position thereof and the control mechanism stops the first conveyor when the roller and the arms are in the stop position thereof thereby halting product flow along the conveyor automatically in response to movement of the roller and the arms from the conveying position thereof to the stop position thereof.

These and other objects of the present invention together with further objects and advantages thereof will best be understood by reference to the following drawings wherein.

Figure 1:
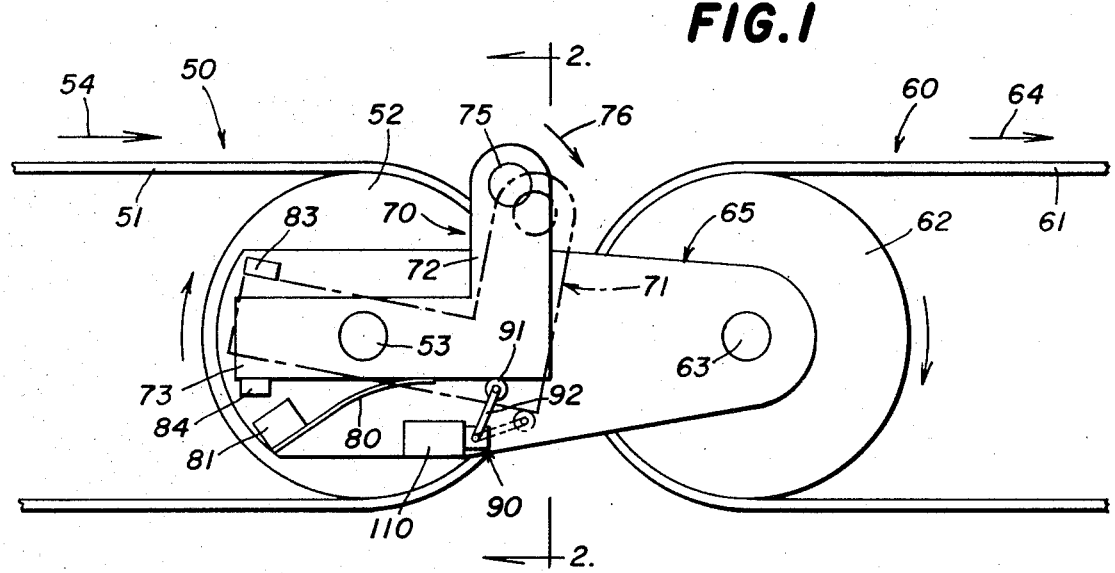
FIG. 1 is a side elevational view of the transfer mechanism mounted for operation between a first and second conveyor.
Figure 2:
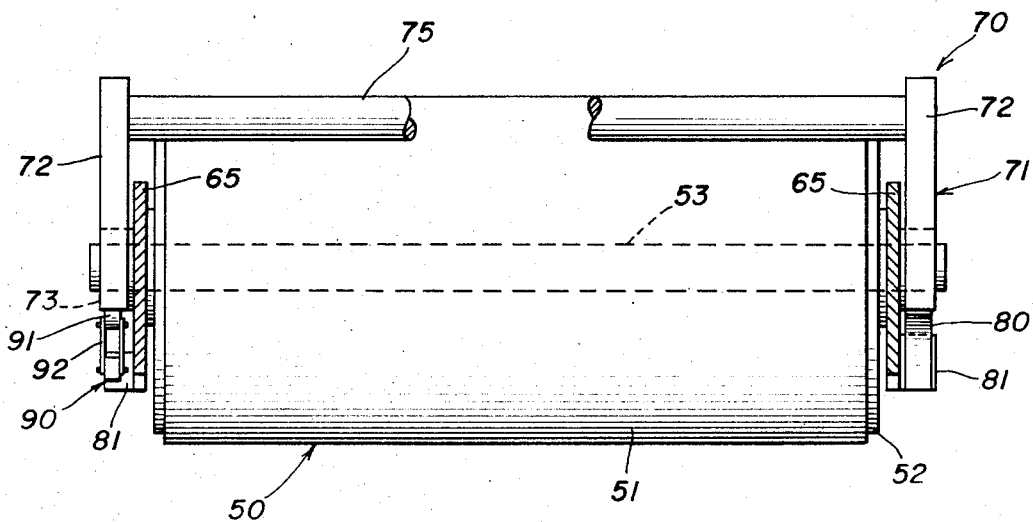
FIG. 2 is an end elevational view of the transfer mechanism and conveyor shown in FIG. 1 as seen along lines 2—2 thereof.

Referring now to the drawings, there is shown a first conveyor 50 including an endless belt 51 which may be wire mesh drivably engaged by a pulley or sprocket 52 mounted on a shaft 53. The conveyor 50, and more particularly the belt 51 thereof upon energization will move in the direction of the arrow 54 shown in FIG. 1. A second conveyor 60 is spaced from the first conveyor 50 and includes an endless belt 61 which also may be wire mesh drivably engaged by a pulley or sprocket 62 mounted on a shaft 63. The upper reach of the endless belt 61 lies in the same plane as the upper reach of the endless belt 51, thereby providing a conveying surface over which an object may be transported. The endless belt 61 of the conveyor 60 upon rotation of the pulley 62 will move in the direction of the arrow 64, thereby providing a transfer path for articles away from the conveyor 50.

A transfer mechanism 70 is positioned intermediate the first conveyor 50 and the second conveyor 60 and includes two arms 71 each of which include an upstanding member 72 and a horizontally extending member 73, the members being disposed at right angles one to the other. A roller 75 is rotatably mounted between the arms 71 and more particularly between the upstanding members 72 thereof. The arms 71 are each mounted for rotation about the shaft 53 of the conveyor 50. The roller 75, and more particularly, the outer peripheral surface thereof is positioned so that the top-most surface thereof lies in the plane formed by the upper reaches of the endless belts 51 and 61, thereby to form a support surface therebetween to transfer objects from the conveyor 50 to the conveyor 60. The roller 75 may be driven by means of a sprocket and chain arrangement (not shown) by the shaft 53.

A spring 80 is mounted on each of the mounting plates 65 by a mounting block 81 and contacts the associated member 73 of the associated arm 71 thereby continually urging the transfer mechanism 70 into the full line position shown in FIG. 1, wherein the roller 75 provides a support surface between the conveyors 50 and 60. Two stop members 83 and 84 are mounted on each of the mounting plates 65 and restrain movement of the arms 71 between the full line position and the dotted line position shown in FIG. 1. A microswitch 90 is mounted on one of the mounting plates 65 so that a roller 91 mounted between two spaced apart arms 92 is in contact with the member 73 of the arms 71, the switch 90 being spring biased to the full line position as shown in FIG. 1. Movement of the arms 71 and therefore the roller 75 to the dotted line position shown in FIG. 1 also moves the switch 90 and, more particularly, the arms 92 and the roller 91 to the dotted line position, the roller 91 following the arms 71 between the full line and the dotted line positions shown in the drawings.

Figure 3:
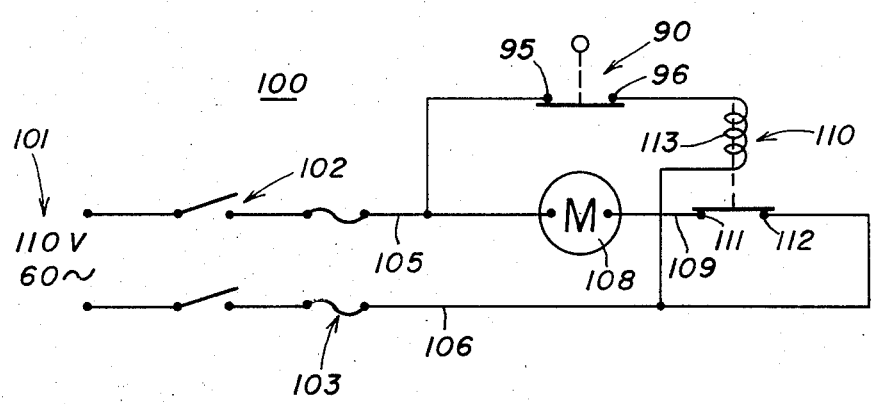
FIG. 3 is a schematic electrical diagram for the transfer mechanism and conveyors shown in FIG. 1.

Referring now to FIG. 3 of the drawings, there is shown a control circuit 100 for the conveyor 50 and transfer mechanism 70 of the present invention. A 110 volt, 60 cycle power supply 101 is connected by conductors 105 and 106 to a main switch 102 and thereafter to a circuit breaker 103. An electric drive motor 108 has one terminal thereof connected to the conductor 105 and the other terminal thereof connected by a conductor 109 to a contact 111 of its solenoid 110. The other terminal 112 of the solenoid 110 is connected to the conductor 106, the coil 113 of the solenoid 110 being connected to the conductor 106 and the terminal 96 of the microswitch 90. The other terminal 95 of the microswitch 90 is connected to the conductor 105. The microswitch 90 is closed when the arms 71 are in the full line position shown in FIG. 1, as are the normally closed contacts of the solenoid 110 when the coil 113 thereof is energized thereby permitting operation of the electric drive motor 108 to drive the pulley 52 of the conveyor 50. When the transfer mechanism 70 pivots from the full line position thereof to the dotted line position thereof, the microswitch 90 and more particularly, the contacts 95 and 96 thereof open causing the coil 113 to de-energize and the contacts 111 and 112 of the solenoid 110 to open, thereby de-energizing the electric drive motor 108 and halting movement of the conveyor 50.

As hereinbefore set forth, when the transfer mechanism 70 is in full line position thereof, the roller 75 thereof is disposed between the conveyors 50 and 60 and provides a rotatable support surface therebetween to assist the transfer of objects or articles from the endless belt 51 of the conveyor 50 to the endless belt 61 of the conveyor 60. If an article or object does not successfully bridge the gap between the conveyors 50 and 60 and becomes jammed therebetween, or if the wire belt 51 becomes entangled or snagged with the roller 75, the transfer mechanism 70 will move in a direction of the arrow 76 to the dotted line position thereof wherein the roller 75 is disposed below the plane formed by the upper reaches of the endless belts 51 and 61 and simultaneously open the microswitch 90 which de-energizes the coil 113 of the solenoid 110 to stop the electric motor 108. De-energization of the electric motor 108 acts as a safety feature and prevents damage to the conveyor 50, particularly when it is of the wire mesh type, and to an article wedged or jammed between the conveyors, and also insures that the operator will not be injured during removal of the jammed object.

Some operators reach between the conveyors 50 and 60 to assist articles from one to the other. The operator may catch a finger in the conveyor belt 51 and the transfer mechanism 70 prevents serious injury to the operator by automatically de-energizing the conveyor 50 upon movement of the transfer mechanism to the stop position thereof. Since the transfer mechanism 70 and more particularly, the arms 71 are continually urged to the full line position thereof by the springs 80, passage of an object or article over the roller 75 will not cause the solenoid 110 to be de-energized. The stops 83 and 84 serve to prevent the arms 71 from being pivoted an amount sufficient to damage the microswitch 90 or to be rotated in a counterclockwise direction as seen in FIG. 1 below the full line position thereof which would cause the roller 75 again to be out of the plane formed by the upper reaches of the endless belts 51 and 61.

While there has been described what is at present considered to be the preferred embodiment of the present invention, it will be understood that various modifications and alterations may be made herein without departing from the true spirit and scope of the present invention, and it is intended to cover in the appended claims all such modifications and alterations as fall within the true spirit and scope of the present invention.

What is claimed is:

1. A mechanism for transferring objects from a first conveyor having a first conveying reach to a second conveyor spaced from said first conveyor and having a second conveying reach, said mechanism comprising a pair of arms mounted for movement with respect to one of said conveyors and carrying a transfer roller therewith, said roller being movable with said arms between a conveying position thereof wherein said roller is disposed with the upper surface thereof substantially in alignment with said conveying reaches to provide a support surface for objects being transferred between said conveyors and a stop position there wherein said roller is disposed below said conveying reaches, biasing means continually urging said arms and said roller to the conveying position thereof, said biasing means exerting sufficient force on said roller to maintain said roller in the conveying position thereof during the passage thereover of an object, and control mechanism responsive to movement of said arms and said roller to the stop position thereof for stopping one of said conveyors, whereby said roller provides a support surface between said conveyors when said arms and said roller are in the conveying position thereof and said control mechanism stops at least one of said conveyors when said roller and said arms are in the stop position thereof thereby halting product flow along said conveyor automatically in response to movement of said roller and said arms from the conveying position thereof to the stop position thereof.

2. The mechanism set forth in claim 1, wherein said first conveyor includes a wire mesh endless belt.

3. The mechanism set forth in claim 1, wherein said arms are mounted on the shaft of one of said conveyors.

4. The mechanism set forth in claim 1, wherein said roller is journalled for rotation in said arms.

5. The mechanism set forth in claim 1, wherein said roller is operatively connected to the shaft of one of said conveyors thereby to rotate said roller.

6. The mechanism set forth in claim 1, wherein said biasing means is a leaf spring mounted in contact with said arms continually to urge said arms to the conveying position thereof.

7. The mechanism set forth in claim 1, wherein said control mechanism includes a microswitch in contact with said arms for movement therewith between the conveying position thereof and the stop position thereof.

8. The mechanism set forth in claim 1, wherein said first conveyor is driven by an electric motor having a solenoid connected to a microswitch activated by movement of said arms from the conveying position thereof to the stop position thereof.

9. The mechanism set forth in claim 1, wherein said control mechanism includes a switch having a follower arm thereon continually urged in contact with said arms and operatively connected to a drive motor for one of said conveyors, movement of said arms from the conveying position thereof to the stop position thereof actuating said switch and interrupting the drive connection between said motor and said conveyor.

10. The mechanism set forth in claim 1, wherein said control mechanism includes a switch mounted on a support plate positioned between pulleys of the conveyors, said support plate also carrying thereon said biasing means and spaced apart stops for limiting movement of said arms between the conveying position thereof and the stop position thereof.

* * * * *